US010841972B2

(12) United States Patent
Choi et al.

(10) Patent No.: US 10,841,972 B2
(45) Date of Patent: Nov. 17, 2020

(54) APPARATUS AND METHOD FOR CONTROLLING PTT SERVICE BY MULTIPLEXING CALL ORIGINATOR AND FLOOR ARBITRATOR

(71) Applicant: Korea Railroad Research Institute, Uiwang-si (KR)

(72) Inventors: Sang Won Choi, Yongin-si (KR); Ju Yeop Kim, Seoul (KR); Yong Soo Song, Uiwang-si (KR); Yong Kyu Kim, Cheonan-si (KR)

(73) Assignee: KOREA RAILROAD RESEARCH INSTITUTE, Uiwang (KR)

( * ) Notice: Subject to any disclaimer, the term of this patent is extended or adjusted under 35 U.S.C. 154(b) by 365 days.

(21) Appl. No.: 15/234,997

(22) Filed: Aug. 11, 2016

(65) Prior Publication Data

US 2017/0048894 A1 Feb. 16, 2017

(30) Foreign Application Priority Data

Aug. 12, 2015 (KR) .................. 10-2015-0113564

(51) Int. Cl.
*H04W 76/45* (2018.01)
*H04W 4/10* (2009.01)
(Continued)

(52) U.S. Cl.
CPC ............ *H04W 76/45* (2018.02); *H04W 4/08* (2013.01); *H04W 4/10* (2013.01); *H04W 76/50* (2018.02)

(58) Field of Classification Search
CPC ... H04W 76/005; H04W 76/007; H04W 4/10; H04W 4/08
See application file for complete search history.

(56) References Cited

U.S. PATENT DOCUMENTS

| | | | | |
|---|---|---|---|---|
| 2008/0205350 A1* | 8/2008 | Sim | ........................ | H04W 48/12 370/336 |
| 2016/0381720 A1* | 12/2016 | Baek | ..................... | H04W 76/12 370/329 |
| 2018/0242119 A1* | 8/2018 | Ko | ........................ | H04W 76/45 |

FOREIGN PATENT DOCUMENTS

| | | |
|---|---|---|
| KR | 100627814 B1 | 9/2006 |
| KR | 100652650 B1 | 12/2006 |
| WO | 2005060501 A2 | 7/2005 |

OTHER PUBLICATIONS

"3rd Generation Partnership Project; Technical Specification Group Services and System Aspects; Functional architecture and information flows to support mission critical communication services; Stage 2 (Release 13)" GPP TS 23.179 V0.2.0, Jul. 2015, pp. 1-97, 3GPP Organizational Partners.

(Continued)

*Primary Examiner* — Jianye Wu

(57) ABSTRACT

A method of Mission Critical Push to Talk (MCPTT) service performed by a mobile terminal includes: generating, at the mobile terminal, a group call announcement for off-network Mission Critical Push to Talk (MCPTT) service, the group call announcement for off-network MCPTT service including information of a period of the group call announcement for off-network MCPTT service; controlling a transceiver to periodically transmit, to one or more mobile terminals, the group call announcement for off-network MCPTT service based on the period; in response to the transmitted group call announcement for off-network MCPTT service, receiving a response from the one or more mobile terminals; and establishing, based on the response from the one or more mobile terminals, a group call with the one or more mobile terminals by setting a direct wireless communication with the one or more mobile terminals.

20 Claims, 6 Drawing Sheets

(51) Int. Cl.
*H04W 4/08* (2009.01)
*H04W 76/50* (2018.01)

(56) References Cited

OTHER PUBLICATIONS

"3rd Generation Partnership Project; Technical Specification Group Core Networks and Terminals; Mission Critical Push to Talk (MCPTT) call control Protocol specification (Release 13)"; 3GPP TS 24.uuu V0.1.0, Aug. 2015, pp. 1-232, 3GPP Organizational Partners.
"Floor Control for Off-network Private Call", 3GPP TSG-SA WG6 Meeting #6 Vancouver, Canada, Aug. 17-21, 2015, pp. 1-5.
"Addition of one parameter regarding off-network group call announcement", 3GPP TSG-SA WG6 Meeting #6 Vancouver, Canada, Aug. 17-21, 2015, pp. 1-3.
"Off-network Floor request during silence", 3GPP TSG-SA WG6 Meeting #5 Seoul, South Korea, Jul. 6-10, 2015, pp. 1-2.
"Introduction for off-network floor control ", 3GPP TSG-SA WG6 Meeting #6 Vancouver, Canada, Aug. 17-21, 2015, pp. 1-2.

\* cited by examiner

APPARATUS AND METHOD FOR CONTROLLING PTT SERVICE BY MULTIPLEXING CALL ORIGINATOR AND FLOOR ARBITRATOR

CROSS-REFERENCE TO RELATED APPLICATION

This application claims priority from and the benefit of Korean Patent Application No. 10-2015-0113564, filed on Aug. 12, 2015, which is hereby incorporated by reference in its entirety.

BACKGROUND

1. Field

The present invention relates to a wireless communication system, more particularly, to a method, an apparatus, software, or a recoding medium that stores software, which provides a PTT service controlling by multiplexing a call originator and a floor arbitrator.

2. Discussion of the Background

As computers, electronics, communication technologies have rapidly developed, various wireless communication services using a wireless telecommunication network have been provided. A basic wireless communication service is a wireless voice call service that wirelessly provides a voice call between the users of communication terminals anytime, anywhere.

A trunked radio system (TRS) among various types of wireless voice call services has a feature of supporting one-to-many push-to-talk (PTT) communication beyond an existing one-to-one wireless communication, and thus, may be effectively and conveniently utilized by transport companies, armies, government branches, and the like. Also, the TRS enables conversation by only pressing a button prepared in a TRS terminal without a process, such as dialing or the like. Due to the feature of allowing conversation immediately and quickly, the TRS is used in various fields. Here, the service provided to the TRS is referred to as a push-to-talk (PTT) service, which is generally provided over a trunked radio service network.

A special purpose communication network that is directly connected with the public safety, such as a national public safety net, needs to increase reliability over communication since it is directly linked with safety from the perspective of the purpose.

Particularly, there is a desire for a system that is capable of effectively coping with an unexpected situation occurring in mission-critical PPT communication that is primarily used in a disastrous situation, so as to increase the reliability of the PTT communication.

SUMMARY

An aspect of the present invention, which is derived by taking into consideration the above described situation, is to provide a PTT control method and apparatus by multiplexing a call originator terminal and a floor arbitrator terminal, so as to secure the reliability of a special purpose communication network, and to smoothly resume a PTT service under a disastrous situation.

Exemplary embodiments of the present invention provide a method and apparatus for supporting a Mission Critical Push to Talk (MCPTT) service.

Exemplary embodiments of the present invention provide a method and apparatus for generating a group call announcement message for a Push to Talk service.

According to an exemplary embodiment, a method of Mission Critical Push to Talk (MCPTT) service performed by a mobile terminal includes: generating, at the mobile terminal, a group call announcement for off-network Mission Critical Push to Talk (MCPTT) service, the group call announcement for off-network MCPTT service including information of a period of the group call announcement for off-network MCPTT service; controlling a transceiver to periodically transmit, to one or more mobile terminals, the group call announcement for off-network MCPTT service based on the period; in response to the transmitted group call announcement for off-network MCPTT service, receiving a response from the one or more mobile terminals; and establishing, based on the response from the one or more mobile terminals, a group call with the one or more mobile terminals by setting a direct wireless communication with the one or more mobile terminals.

According to an exemplary embodiment, a mobile terminal includes: a transceiver to transmit and receive a wireless signal; and a processor operationally coupled to the transceiver and configured to: generate a group call announcement for off-network Mission Critical Push to Talk (MCPTT) service, the group call announcement for off-network MCPTT service including information of a period of the group call announcement for off-network MCPTT service; control the transceiver to periodically transmit, to one or more mobile terminals, the group call announcement for off-network MCPTT service based on the period; and establish a group call with the one or more mobile terminals by setting a direct wireless communication with the one or more mobile terminals.

According to an exemplary embodiment, a mobile terminal includes: a transceiver to receive, from a call originating mobile terminal, a group call announcement for off-network Mission Critical Push to Talk (MCPTT) service, the group call announcement for off-network MCPTT service including information of a period of the group call announcement for off-network MCPTT service; and a processor operationally coupled to the transceiver and configured to: identify the information of the period of the group call announcement for off-network MCPTT service from the received group call announcement; establish a group call with a group of mobile terminals including the call originating mobile terminal by setting a direct wireless communication with the group of mobile terminals; and monitor a periodic reception of the group call announcement for off-network MCPTT service based on the identified information of the period of the group call announcement for off-network MCPTT service.

According to an exemplary embodiment, there is provided a method of controlling push-to-talk (PTT) in a wireless communication network, the method including: defining a call originator terminal and at least one participant terminal that participates in PTT communication, among at least two terminals prepared for PTT communication, and transmitting, by the initial call originator terminal, a group call announcement signal including a corresponding period value to the at least one participant terminal based on a predetermined period; detecting, by the at least one participant terminal, whether the call originator terminal malfunctions based on whether the group call announcement signal is received during the period value; and when the initial call originator terminal malfunctions, changing, to a call originator terminal, at least one terminal that is included in a call originator candidate terminal group list, which terminals share for changing a call originator terminal, and performing call originating.

The detecting of whether the call originator terminal malfunctions, further includes: measuring, by the participant terminal, a period value of a group call announcement signal transmission which is transmitted in PTT communication of a currently set group; comparing, by the participant terminal, a threshold value that is set in advance for the announcement signal and the measured period value; and determining the malfunction of the call originator terminal when the measured period value exceeds the threshold value.

When two or more call originator terminals exist for the change, the method performs: selecting, by a terminal that detects the malfunction of the call originator terminal, a call originator terminal based on the predetermined call originator candidate terminal group list; and performing PTT communication through the selected call originator terminal.

The selecting of the call originator terminal includes: setting rankings based on a physical state, the degree of usage of radio resources, a distance, and a response speed in association with call originator candidate terminals, which have at least one of the features, in the call originator candidate terminal group list; and selecting a call originator terminal based on the set rankings.

According to an exemplary embodiment, there is provided a method of controlling Push-to-Talk (PTT) using a PTT service for performing PTT communication in a wireless communication network, the method including: defining a floor arbitrator terminal and at least one participant terminal that participates in PTT communication, among at least two terminals prepared for PTT communication, and setting one of the terminals as a floor arbitrator terminal for controlling the floor among the terminals; transmitting, by the floor arbitrator terminal, a media to another terminal based on a predetermined period, and controlling the floor of each terminal in the group; detecting, by a participant terminal that receives the media, whether the terminal set as the floor arbitrator terminal malfunctions based on whether a media is received during a predetermined period; and when the initial floor arbitrator terminal malfunctions, changing, to a floor arbitrator terminal, at least one terminal included in a floor arbitrator candidate terminal group list that terminals share for changing a floor arbitrator terminal.

The detecting of whether the floor arbitrator terminal malfunctions includes: measuring, by the terminal that receives the media, a duration time or a maximum transmission time of a recent media transmission that is transmitted in the PTT communication of a currently set group; comparing, by the terminal, the measured duration time or the measured maximum transmission time with a corresponding threshold value set in advance; and determining the malfunction of the floor arbitrator terminal when the comparison shows that the measurement exceeds the threshold value.

When two or more floor arbitrator terminals exist for the change, the method performs: selecting, by the terminal that detects the malfunction of the floor arbitrator terminal, a floor arbitrator terminal based on the predetermined floor arbitrator candidate terminal group list; and performing PTT communication through the selected floor arbitrator terminal.

The selecting of the floor arbitrator terminal includes: setting rankings based on a physical state, the degree of usage of radio resources, a distance, and a response speed in association with floor arbitrator candidate terminals, which have at least one of the features, in the floor arbitrator candidate terminal group list; and selecting a floor arbitrator terminal based on the set rankings.

DETAILED DESCRIPTION OF THE ILLUSTRATED EMBODIMENTS

A disaster and safety management push-to-talk (mission critical push-to-talk (MCPTT)) service in a special purpose communication network may be briefly classified as an on-network that operates within a network coverage and an off-network that operates outside the network coverage.

The PTT service includes a server for floor control, and provides a service by enabling a terminal, which is assigned with a floor by the floor control of the server, to transmit voice media to another terminal that occupies a floor, and thus, an one-to-one call, an one-to-group call, a group-to-group call are possible.

The MCPTT service which is PTT communication in the on-network may include a group setting function, a group call setting function, a one-to-group/one-to-one/group-to-group call method function, a call control and group control function, and the like.

The MCPTT is divided into a signaling plane for authenticating a terminal and establishing a session for PTT communication, and a media plane for transmitting voice.

The MCPTT in the on-network performs multiple PTT group communication, and multiple entities that perform call originating and floor arbitrating may be connected through a wireless communication network. In this instance, an entity that performs floor arbitrating may serve as a server that performs floor control. Also, a terminal in the signaling plane may pass through an evolved packet core (EPC; not illustrated) through a wireless communication network (radio access network), and may be connected to a floor control server which is a floor arbitrator terminal, through a SIP core (a core element for a session initiation protocol (not illustrated)).

In the on-network, the terminal is in charge of a function for wirelessly accessing a communication network, and the EPC provides a function that enables a terminal that accesses using a wireless network, to be connected to another network system. Also, the SIP core is connected to a floor control server, and may provide a function for signaling routing and session management. The terminal may be, for example, a smart phone, a phablet, a tablet, a personal computer, and the like.

The floor control server plays a pivotal role for providing an MCPTT service to each terminal, and provides a group management and user information control function.

In addition, the terminal in the media plane passes through the EPC through the wireless communication network, and may be connected to a media resource control device and the floor control server. The media resource control device controls an actual media transmission path for a group call, a voice transmission right, the conversion of a codec, and the like. The media may be, for example, media in the form of sound, images, or the like.

The floor control server may control a media transmission for MCPTT communication, through the media resource control device.

Figure 3:
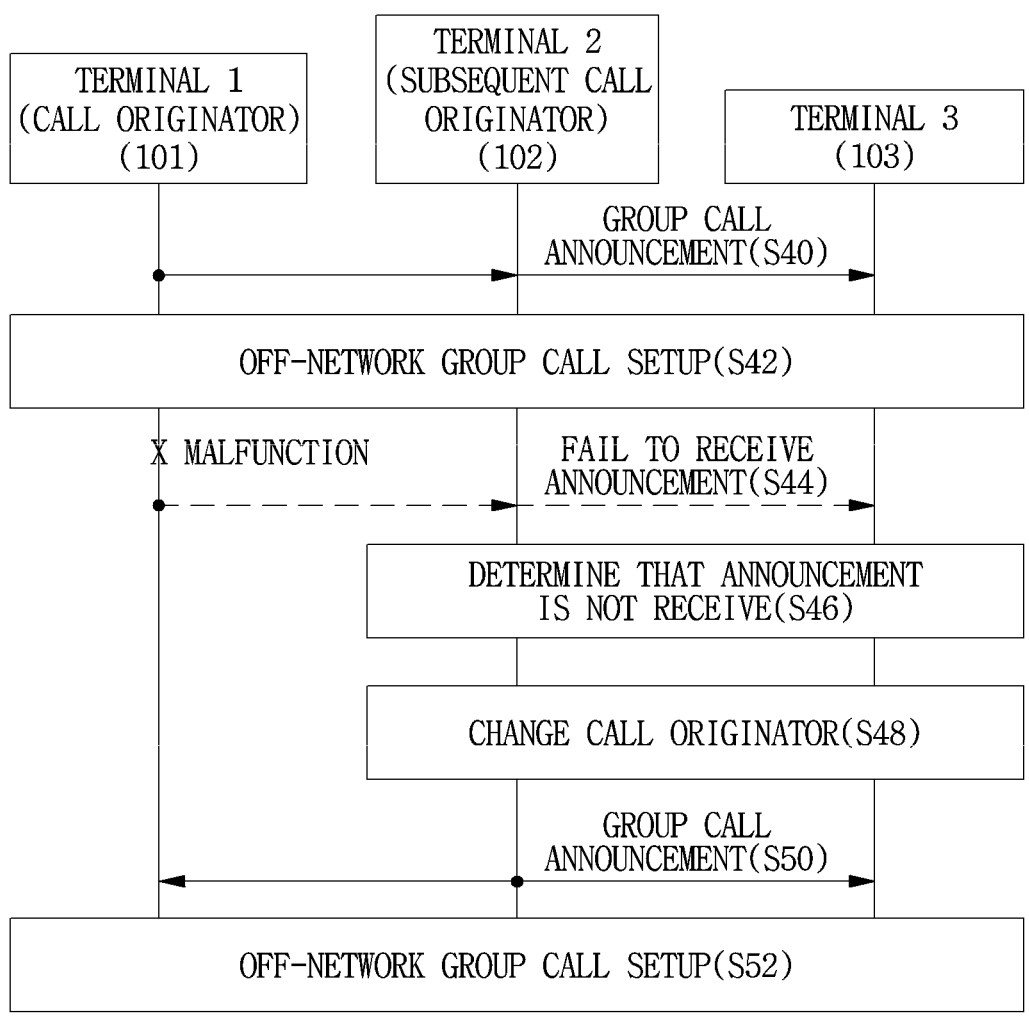
FIG. 3 is a data flow diagram illustrating a PTT control method by multiplexing a call originator terminal in a PTT control method according to an exemplary embodiment of the present invention.

FIG. 3 is a data flow diagram illustrating a PTT control method by multiplexing a call originator terminal in a PTT control method according to an exemplary embodiment of the present invention.

In an off-network, PTT communication may be performed through direct communication between terminals.

That is, in the off-network, a terminal may become a call originator terminal that is in charge of call setup or may become a floor arbitrator terminal that is in charge of floor control, so as to control PTT communication.

In this instance, the rankings of terminals appropriate for a call originator terminal or a floor arbitrator terminal may be set in advance based on the topologies of terminals. A ranking selection standard may be set to select a call originator terminal, based on a physical state, the degree of usage of radio resources, a distance, a response speed, a communication state, and the like in association with call originator candidate terminals included in a call originator candidate terminal group list.

When two or more call originator terminals or two or more floor arbitrator terminals may exist for the change, a terminal that detects the malfunction of a corresponding terminal, selects one of the call originator terminals based on a predetermined ranking, and performs PTT communication through the selected call originator terminal.

FIG. 3 illustrates a procedure of PTT communication in the situation in which a terminal 1 101 is set as a call originator terminal.

That is, the embodiment of FIG. 3 assumes that the terminal 1 101 is set as a call originator terminal as an initial condition, and assumes that a call originator terminal selection ranking is set to an order of terminal 1>terminal 2>terminal 3.

First, the terminal 1 101 that is set as the call originator terminal transmits a group call announcement to a terminal 2 102 and a terminal 3 103 in operation S40.

As the terminal 2 102 and the terminal 3 103 normally receive the group call announcement, off-network group call setup is fulfilled, and PTT communication begins in operation S42.

Subsequently, when malfunction occurs in the terminal 1 101 that is set as the call originator terminal, under a disastrous situation, the terminal 2 102 and the terminal 3 103 may fail to receive a group call announcement signal during a period, which has been periodically received. That is, based on the result of reception during the period, the malfunction of the call originator terminal may be detected.

The terminal 2 102 or the terminal 3 103 that fails to receive the group call announcement signal, determines that the announcement signal is not received during the period in operation S44 and S46.

The terminal 2 102 or the terminal 3 103 that determines that the announcement signal is not received, determines a predetermined ranking for changing the call originator terminal, and the terminal 2 102 is changed into a call originator terminal based on the ranking in operation S48.

Subsequently, the terminal 2 102 that is changed to the call originator terminal transmits a group call announcement signal periodically to the terminal 3 103, and off-network group call setup may be fulfilled by the terminal 2 102, in operation S50 and S52.

In addition, a terminal that serves as a call originator terminal in the off-network periodically transmits a group call announcement signal including at least a call originator candidate terminal group list to the remaining terminals, as PTT group communication related information. In this instance, information associated with a period value is included therein. Accordingly, each terminal detects the malfunction of the terminal that serves as the call originator terminal based on whether an announcement signal of the call originator terminal is received during the period value, changes the terminal after detecting the malfunction, and resumes the PTT communication.

Figure 1:
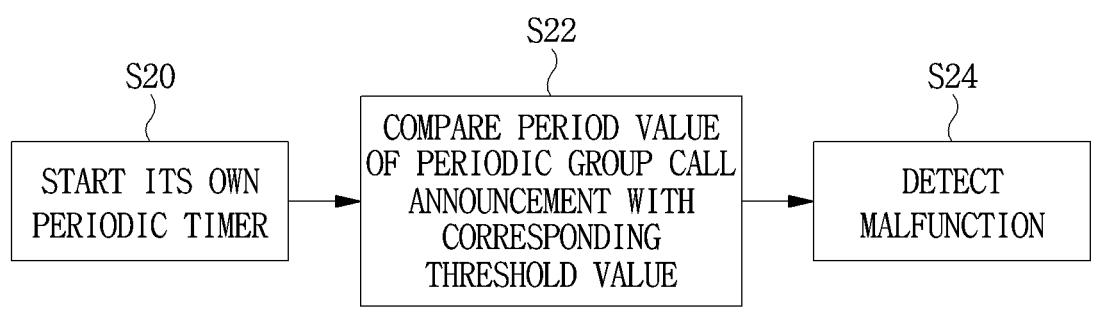
FIG. 1 illustrates a process of detecting the malfunction of a call originator terminal in a PTT communication method according to an exemplary embodiment of the present invention.

Particularly, referring to FIG. 1, the detection of the malfunction of the call originator terminal may be performed as follows. A terminal that participates in a group call starts its own timer in operation S20, the terminal measures the period value of a group call announcement signal that is periodically transmitted in the communication of a currently set PTT group, and compares the same with a predetermined threshold value in operation S22, and determines the malfunction of the corresponding call originator terminal when the period value is greater than the threshold value in operation S24.

Figure 4:
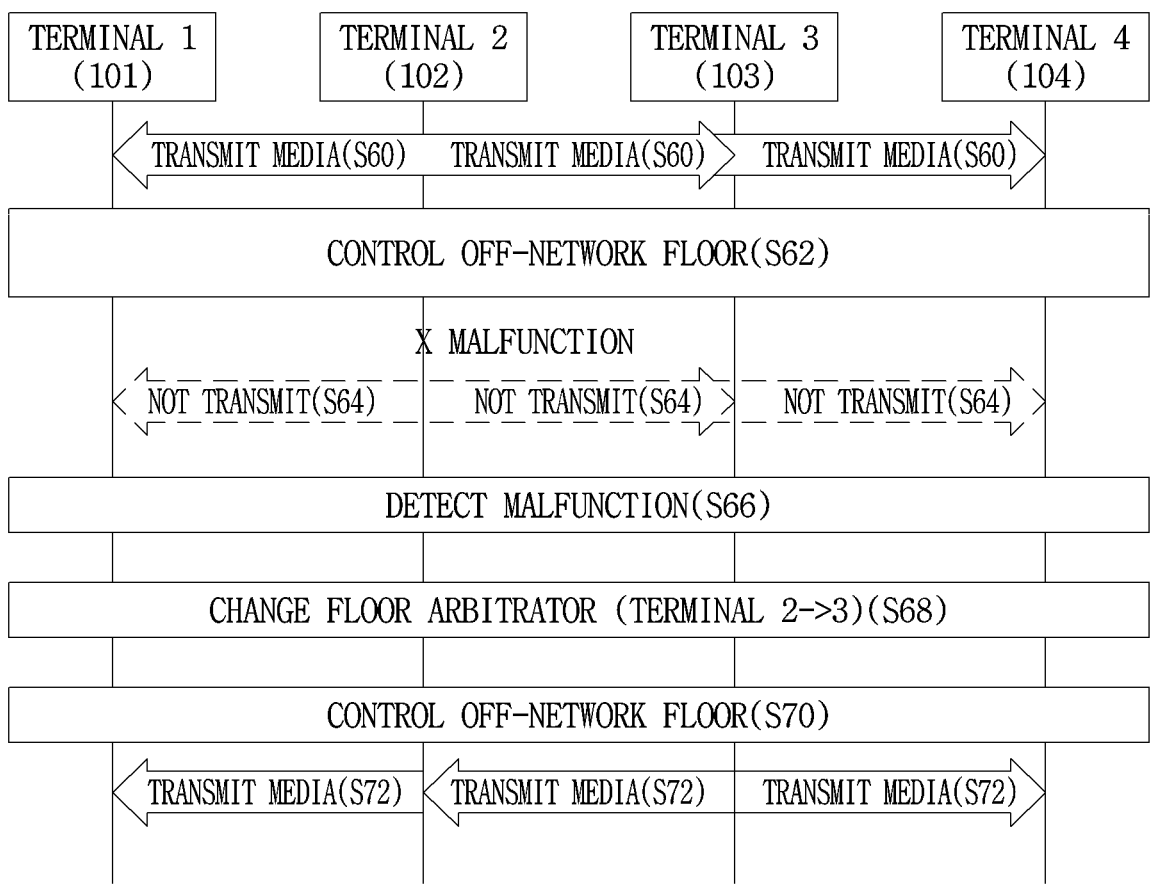
FIG. 4 is a data flow diagram illustrating a PTT process by multiplexing a floor arbitrator terminal according to a first embodiment of a PTT control method according to an exemplary embodiment of the present invention.

FIG. 4 is a data flow diagram illustrating a PTT communication process by multiplexing a floor arbitrator terminal in an off-network according to a first embodiment of a PTT control method according to an exemplary embodiment of the present invention.

In the PTT control method according to the first embodiment of the present invention, the following signaling may be defined in the off-network.

In the off-network, a terminal serves as a floor arbitrator terminal, and arbitrates PTT communication. In this instance, the rankings of terminals appropriate for a floor arbitrator terminal are determined in advance based on the topologies of terminals. A ranking selection standard may be set to select a floor arbitrator terminal, based on a physical state, the degree of usage of radio resources, a distance, a response speed, a communication state, and the like in association with floor arbitrator candidate terminals included in a floor arbitrator candidate terminal group list.

FIG. 4 illustrates a procedure of performing PTT communication by assuming that the terminal 2 102 is set as a current floor arbitrator terminal, and assuming that the floor arbitrator terminal selection ranking is based on an order of terminal 2>terminal 3>terminal 4>terminal 1.

First, terminals that participate in PTT communication of a set group receive voice media from the terminal 2 102 that serves as a floor arbitrator terminal in operation S60.

The terminal 2 102 controls a floor among terminals so that PTT communication is smoothly executed in the off-network in operation S62.

When malfunction occurs in the terminal 2 102 since a disastrous situation occurs during PTT communication, the voice media that should be transmitted from the terminal 2 102 to the terminal 1101, the terminal 3 103, and the terminal 4 104, is not transmitted in operation S64.

The terminal 1101, the terminal 3 103, or the terminal 4 104 that receives the voice media recognizes that a voice media is not received during a set period, and detects the malfunction of the terminal 2 102 in operation S66.

When at least one terminal detects the malfunction of the terminal 2 102, the terminal checks the predetermined ranking and requests the terminal 3 103 which corresponds to a subsequent ranking to change the floor arbitrator terminal in operation S68.

The terminal 3 103 that is changed into the floor arbitrator terminal based on the predetermined ranking may control the floor in the off-network, and the terminal 3 103 transmits voice media to the terminal 1101, the terminal 2 102, or the terminal 4 104 in operation S68, S70, and S72.

Figure 2:
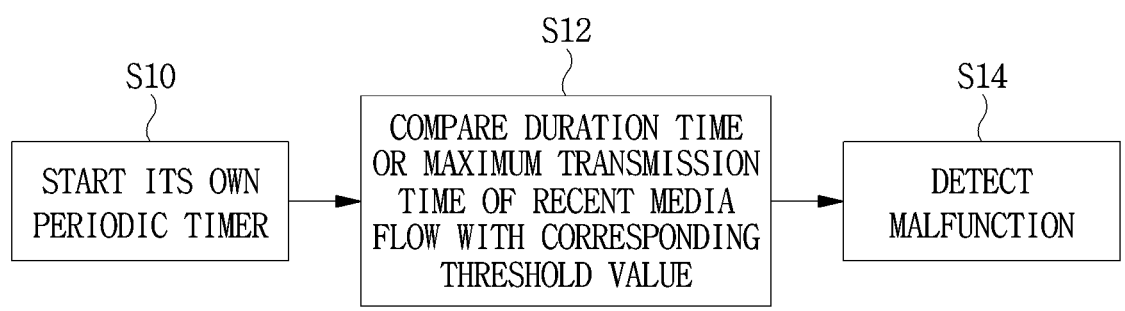
FIG. 2 illustrates a process of detecting the malfunction of a floor control terminal in a PTT control method according to an exemplary embodiment of the present invention.

Referring to FIG. 2, the detection of the malfunction of the terminal 2 102 in the first embodiment may be performed as follows. At least one of the remaining participant terminals (the terminal 1101, the terminal 3 103, or the terminal 4 104) that receive voice media from the floor arbitrator terminal starts its own timer in operation S10, measures a duration time or a maximum transmission time of a recent voice media transmission that is transmitted in the PTT communication of a currently set group during a timer period and compares the measurement value with a predetermined threshold value set for a corresponding measurement value in operation S12, and determines the malfunction of the corresponding floor arbitrator terminal when each measurement value is greater than a corresponding threshold value in operation S14.

Figure 5:
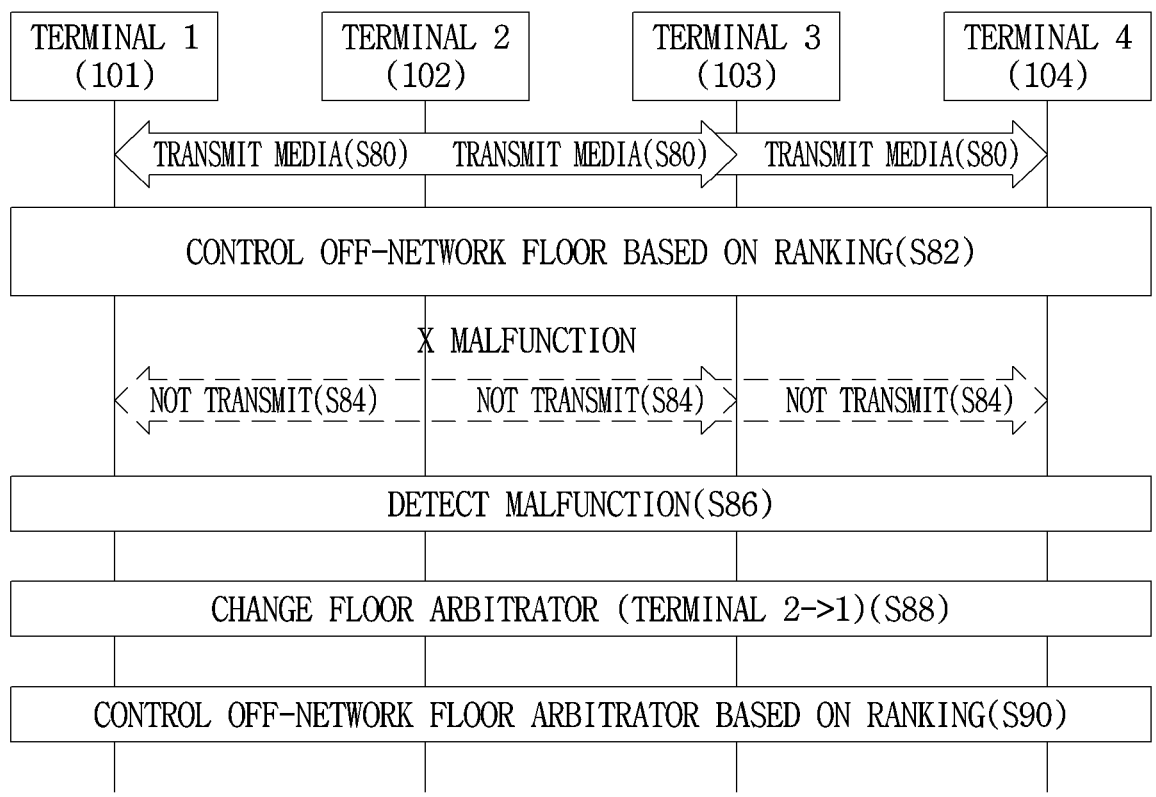
FIG. 5 is a data flow diagram illustrating a PTT process by multiplexing a floor arbitrator terminal according to a second embodiment of a PTT control method according to an exemplary embodiment of the present invention.

FIG. 5 is a data flow diagram illustrating a PTT communication process by multiplexing a floor arbitrator terminal in an off-network according to the second embodiment of the present invention, in the PTT control method by multiplexing a call originator terminal and a floor arbitrator terminal.

In the off-network, a terminal serves as a floor arbitrator terminal, and arbitrates PTT communication. In this instance, the rankings of terminals appropriate for a floor arbitrator terminal are determined in advance based on the topologies of terminals. FIG. 5 illustrates a procedure of performing PTT communication by assuming that the terminal 2 102 is set as a current floor arbitrator terminal, and assuming that the floor arbitrator terminal selection ranking is based on an order of terminal 2>terminal 1>terminal 3>terminal 4.

First, terminals that participate in PTT communication of a set group receive voice media from the terminal 2 102 that serves as a floor arbitrator terminal in operation S80.

The terminal 2 102 controls a floor among terminals so that PTT communication is smoothly executed in the off-network in operation S82.

When malfunction occurs in the terminal 2 since a disastrous situation occurs during PTT communication, the voice media that should be transmitted from the terminal 2 102 to the terminal 1101, the terminal 3 103, and the terminal 4 104, is not transmitted in operation S84.

The terminal 1101, the terminal 3 103, or the terminal 4 104 that receives the voice media recognizes that voice media is not received, and detects the malfunction of the terminal 2 102 in operation S86.

When at least one terminal detects the malfunction of the terminal 2 102, the terminal checks the predetermined ranking and requests the terminal 1 101 which corresponds to a subsequent ranking to change the floor arbitrator terminal.

The terminal 1 101 that is changed into the floor arbitrator terminal based on the predetermined ranking may control the floor in the off-network, and the terminal 3 103 transmits voice media to the terminal 1101, the terminal 2 102, or the terminal 4 104 in operation S88 and S90.

The detection of the malfunction of the terminal 2 102 in the second embodiment of the present invention may be performed by measuring a duration time or a maximum transmission time of a media transmission, and comparing the measurement value with a corresponding predetermined threshold value, in the same manner as the first embodiment of the present invention.

Figure 6:
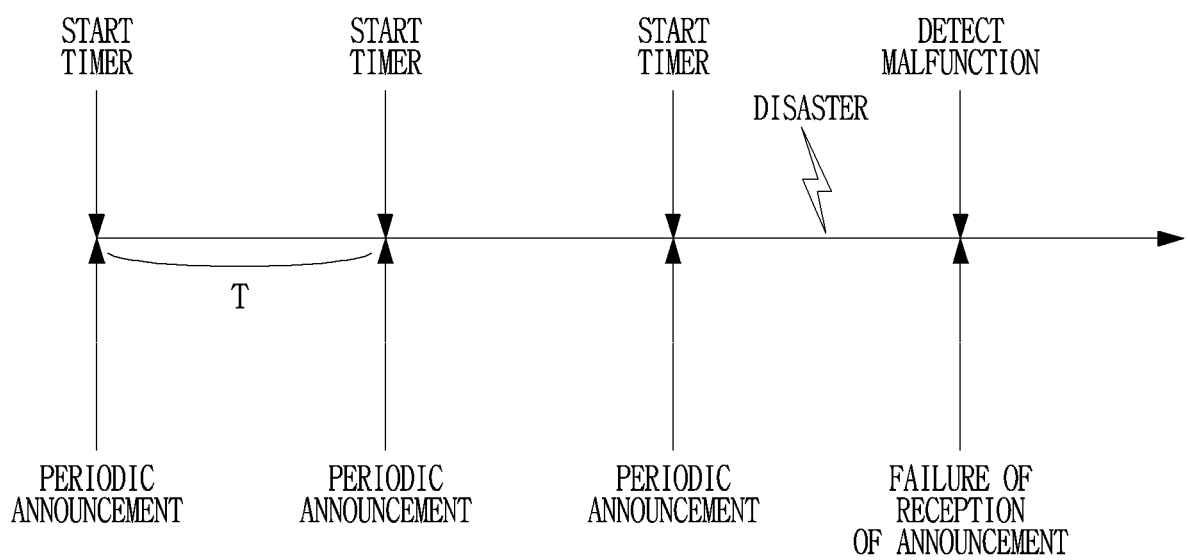
FIG. 6 illustrates a process of detecting the malfunction of a call originator terminal or a floor arbitrator terminal using a timer in a PTT control method according to an exemplary embodiment of the present invention.

In addition, the procedure of detecting the unexpected malfunction of a floor arbitrator terminal under a disastrous situation in the on-network and the off-network, may be expressed in the time axis, as shown in FIG. 6.

An entity that performs call originating or floor arbitrating periodically provides an announcement. In this instance, when a predetermined period value is T, each terminal that participates in PTT group communication includes its own timer, and checks whether an announcement signal or voice media is received through a signaling during the predetermined period of T. That is, the timer operates by being initiated for each period of T. The timer may determine whether a signaling is received from the entity that performs call originating or floor arbitrating before being initiated for each period of T. When the announcement signal is not received during the period, this may be regarded as the malfunction of the entity. Here, the entity may be a server that performs call setup or floor control in the on-network, or a terminal that performs call originating or floor arbitrating in the off-network.

Particularly, in the PTT group communication, the role of an entity that serves as a floor arbitrator terminal, which adjusts the entire PTT group communication floors in the PTT group communication, is very important.

That is, the entity that performs as a floor arbitrator terminal is in charge of a floor control function. Accordingly, in accordance with an exemplary embodiment of the present invention, a terminal that participates in the PTT group communication detects whether the entity that serves as a floor arbitrator terminal normally operates. When the corresponding entity has difficulty in performing floor control due to malfunction or the like, PTT communication may be maintained constantly through another entity that serves as a floor arbitrator terminal.

According to an exemplary embodiment, a method of controlling push-to-talk (PTT) in a wireless communication network is provided. The method includes: defining a call originator terminal and at least one participant terminal that participates in a PTT communication, among at least two terminals prepared for the PTT communication, and transmitting, by the initial call originator terminal, a group call announcement signal including a corresponding period value to the at least one participant terminal based on a predetermined period; detecting, by the at least one participant terminal, whether the call originator terminal malfunctions based on whether the group call announcement signal is received during the period value; and when the initial call originator terminal malfunctions, changing, to a call originator terminal, at least one terminal that is included in a call originator candidate terminal group list, which terminals share for changing a call originator terminal, and performing call originating.

The detecting of whether the call originator terminal malfunctions, further includes: measuring, by the participant terminal, a period value of a group call announcement signal transmission which is transmitted in PTT communication of a currently set group; comparing, by the participant terminal, a threshold value that is set in advance for the announcement signal and the measured period value; and determining the malfunction of the call originator terminal when the measured period value exceeds the threshold value.

When two or more call originator terminals exist for the change, the method performs: selecting, by a terminal that detects the malfunction of the call originator terminal, a call originator terminal based on the predetermined call originator candidate terminal group list; and performing PTT communication through the selected call originator terminal.

The selecting of the call originator terminal includes: setting rankings based on a physical state, the degree of usage of radio resources, a distance, and a response speed in association with call originator candidate terminals, which have at least one of the features, in the call originator candidate terminal group list; and selecting a call originator terminal based on the set rankings.

According to an exemplary embodiment, a method of controlling push-to-talk (PTT) using a PTT service for performing PTT communication in a wireless communication network is provided. The method includes: defining a floor arbitrator terminal and at least one participant terminal that participates in PTT communication, among at least two terminals prepared for PTT communication, and setting one of the terminals as a floor arbitrator terminal for controlling the floor among the terminals; transmitting, by the floor arbitrator terminal, a media to another terminal based on a predetermined period, and controlling the floor of each terminal group; detecting, by a participant terminal that receives the media, whether the terminal set as the floor arbitrator terminal malfunctions based on whether a media is received during a predetermined period; and when the initial floor arbitrator terminal malfunctions, changing, to a floor arbitrator terminal, at least one terminal included in a floor arbitrator candidate terminal group list that terminals share for changing a floor arbitrator terminal.

The detecting of whether the floor arbitrator terminal malfunctions includes: transmission time of a recent media transmission that is transmitted in the PTT communication of a currently set group; comparing, by the terminal, the measured duration time or the measured maximum transmission time with a corresponding threshold value set in advance; and determining the malfunction of the floor arbitrator terminal when the comparison shows that the measurement exceeds the threshold value.

When two or more floor arbitrator terminals exist for the change, the method performs: selecting, by the terminal that detects the malfunction of the floor arbitrator terminal, a floor arbitrator terminal based on the predetermined floor arbitrator candidate terminal group list; and performing PTT communication through the selected floor arbitrator terminal.

The selecting of the floor arbitrator terminal includes: setting rankings based on a physical state, the degree of usage of radio resources, a distance, and a response speed in association with floor arbitrator candidate terminals, which have at least one of the features, in the floor arbitrator candidate terminal group list; and selecting a floor arbitrator terminal based on the set rankings.

According to an exemplary embodiment, a method of Mission Critical Push to Talk (MCPTT) service performed by a mobile terminal is provided. The method includes: generating, at the mobile terminal, a group call announcement for off-network Mission Critical Push to Talk (MCPTT) service, the group call announcement for off-network MCPTT service including information of a period of the group call announcement for off-network MCPTT service; controlling a transceiver to periodically transmit, to one or more mobile terminals, the group call announcement for off-network MCPTT service based on the period; in response to the transmitted group call announcement for off-network MCPTT service, receiving a response from the one or more mobile terminals; and establishing, based on the response from the one or more mobile terminals, a group call with the one or more mobile terminals by setting a direct wireless communication with the one or more mobile terminals.

According to an exemplary embodiment, a mobile terminal includes: a transceiver to transmit and receive a wireless signal; and a processor operationally coupled to the transceiver and configured to: generate a group call announcement for off-network Mission Critical Push to Talk (MCPTT) service, the group call announcement for off-network MCPTT service including information of a period of the group call announcement for off-network MCPTT service; control the transceiver to periodically transmit, to one or more mobile terminals, the group call announcement for off-network MCPTT service based on the period; and establish a group call with the one or more mobile terminals by setting a direct wireless communication with the one or more mobile terminals.

The processor may further be configured to control the transceiver to periodically transmit the group call announcement for off-network MCPTT service after establishing the group call with the one or more mobile terminals. The processor may further be configured to determine the period of the group call announcement for off-network MCPTT service, and the period of the group call announcement for off-network MCPTT service may be determined per group.

The processor may further be configured to determine that the mobile terminal is off-network and to determine the periodic transmission of the group call announcement for off-network MCPTT service without using a radio access network. While the mobile terminal is on-network, the processor may further be configured to establish a connection with a floor control server and to perform a group call of on-network MCPTT service through a mobile communication with a radio access network.

The processor may further be configured to establish a media plane for controlling at least one of a media transmission path for the group call of on-network MCPTT service, a voice transmission right, and a codec conversion. The group call announcement for off-network MCPTT service includes information about a group call.

According to an exemplary embodiment, a mobile terminal includes: a transceiver to receive, from a call originating mobile terminal, a group call announcement for off-network Mission Critical Push to Talk (MCPTT) service, the group call announcement for off-network MCPTT service including information of a period of the group call announcement for off-network MCPTT service; and a processor operationally coupled to the transceiver and configured to: identify the information of the period of the group call announcement for off-network MCPTT service from the received group call announcement; establish a group call with a group of mobile terminals including the call originating mobile terminal by setting a direct wireless communication with the group of mobile terminals; and monitor a periodic reception of the group call announcement for off-network MCPTT service based on the identified information of the period of the group call announcement for off-network MCPTT service.

The processor may further be configured to continuously monitor the periodic reception of the group call announcement for off-network MCPTT service after establishing the group call with the group of mobile terminals. While the mobile terminal is on-network, the processor may further be configured to establish a connection with a floor control server and to perform a group call of on-network MCPTT service through a mobile communication with a radio access network.

The processor may further be configured to determine a change of the call originating mobile terminal when the mobile terminal fails to detect the periodic reception of the group call announcement for off-network MCPTT service. The processor may further be configured to determine a change of the call originating mobile terminal based on a threshold associated with the period.

The processor may further be configured to determine a change of the call originating mobile terminal based on a reception state of media data.

The processor may further be configured to determine a change of the call originating mobile terminal based on ranking information of call originator candidates. The ranking information of call originator candidates may be pre-configured based on a topology of mobile terminals. The processor may further be configured to reset a timer based on the period.

According to one or more exemplary embodiments of the present invention, by effectively coping with the abnormality of a server or a terminal that unexpectedly performs call setup and plays a role of a floor arbitrator in a special purpose communication network, the reliability of the PTT communication and the safety of operation may be improved.

In addition, by securing the reliability of the PTT communication and the safety of operation, mission-critical special purpose communication that is directly linked with the life of the people may be smoothly performed.

What is claimed is:

1. A method of Mission Critical Push to Talk (MCPTT) service performed by a mobile terminal, the method comprising:
   generating, at the mobile terminal, a group call announcement for off-network Mission Critical Push to Talk (MCPTT) service, the group call announcement for off-network MCPTT service comprising a field indicating a period of the group call announcement for off-network MCPTT service;
   controlling a transceiver to periodically transmit, to one or more mobile terminals and based on the period, the group call announcement for off-network MCPTT service comprising the field indicating the period;
   in response to the transmitted group call announcement for off-network MCPTT service, receiving a response from the one or more mobile terminals; and
   establishing, based on the response from the one or more mobile terminals, a group call with the one or more mobile terminals by setting a direct wireless communication with the one or more mobile terminals.

2. The method of claim 1, further comprising controlling the transceiver to continue the periodic transmission of the group call announcement for off-network MCPTT service after establishing the group call with the one or more mobile terminals.

3. The method of claim 1, further comprising determining the period of the group call announcement for off-network MCPTT service,
   wherein the period of the group call announcement for off-network MCPTT service is determined per group.

4. The method of claim 1, further comprising:
   determining that the mobile terminal is off-network; and
   determining the periodic transmission of the group call announcement for off-network MCPTT service without using a radio access network.

5. The method of claim 1, further comprising:
   while the mobile terminal is on-network, establishing a connection with a floor control server and performing a group call of on-network MCPTT service through a mobile communication with a radio access network.

6. The method of claim 1, further comprising:
   receiving, by the mobile terminal and from a call originating mobile terminal, another group call announcement for off-network MCPTT service comprising a field indicating a different period of the another group call announcement for off-network MCPTT service; and
   establishing, based on the received another group call announcement for off-network MCPTT service, another group call with the call originating mobile terminal.

7. A mobile terminal comprising:
   a transceiver to transmit and receive a wireless signal; and
   a processor operationally coupled to the transceiver and configured to:
   generate a group call announcement for off-network Mission Critical Push to Talk (MCPTT) service, the group call announcement for off-network MCPTT service comprising a field indicating a period of the group call announcement for off-network MCPTT service;
   control the transceiver to periodically transmit, to one or more mobile terminals and based on the period, the group call announcement for off-network MCPTT service comprising the field indicating the period; and
   establish a group call with the one or more mobile terminals by setting a direct wireless communication with the one or more mobile terminals.

8. The mobile terminal of claim 7, wherein the processor is further configured to control the transceiver to periodically transmit the group call announcement for off-network MCPTT service after establishing the group call with the one or more mobile terminals.

9. The mobile terminal of claim 7, wherein the processor is further configured to determine the period of the group call announcement for off-network MCPTT service, and
   wherein the period of the group call announcement for off-network MCPTT service is determined per group.

10. The mobile terminal of claim 7, wherein the processor is further configured to determine that the mobile terminal is off-network and to determine the periodic transmission of the group call announcement for off-network MCPTT service without using a radio access network.

11. The mobile terminal of claim 7, wherein, while the mobile terminal is on-network, the processor is further configured to establish a connection with a floor control server and to perform a group call of on-network MCPTT service through a mobile communication with a radio access network, and wherein the processor is further configured to establish a media plane for controlling at least one of a media transmission path for the group call of on-network MCPTT service, a voice transmission right, and a codec conversion.

12. The mobile terminal of claim 7, wherein the group call announcement for off-network MCPTT service comprises information about a group call.

13. The mobile terminal of claim 7, wherein the transceiver receives, from a call originating mobile terminal, another group call announcement for off-network MCPTT service comprising a field indicating a different period of the another group call announcement for off-network MCPTT service, and
wherein the processor is configured to establish, based on the received another group call announcement for off-network MCPTT service, another group call with the call originating mobile terminal.

14. A mobile terminal comprising:
a transceiver to receive, from a call originating mobile terminal, a group call announcement for off-network Mission Critical Push to Talk (MCPTT) service, the group call announcement for off-network MCPTT service comprising a field indicating a period of the group call announcement for off-network MCPTT service; and
a processor operationally coupled to the transceiver and configured to:
identify the field indicating the period of the group call announcement for off-network MCPTT service from the received group call announcement; and
establish a group call with a group of mobile terminals including the call originating mobile terminal by setting a direct wireless communication with the group of mobile terminals,
wherein the processor is configured to generate another group call announcement for off-network MCPTT service comprising a field indicating a different period of the another group call announcement for off-network MCPTT service,
wherein the transceiver periodically sends, based on the different period, the another group call announcement for off-network MCPTT service comprising the field indicating the different period, and
wherein the mobile terminal is a call originating mobile device for the another group call announcement for off-network MCPTT service.

15. The mobile terminal of claim 14, wherein the processor is further configured to continuously monitor, based on the period, a periodic reception of the group call announcement for off-network MCPTT service after establishing the group call with the group of mobile terminals.

16. The mobile terminal of claim 14, wherein, while the mobile terminal is on-network, the processor is further configured to establish a connection with a floor control server and to perform a group call of on-network MCPTT service through a mobile communication with a radio access network.

17. The mobile terminal of claim 14, wherein the processor is further configured to determine a change of the call originating mobile terminal when the mobile terminal fails to detect a periodic reception of the group call announcement for off-network MCPTT service.

18. The mobile terminal of claim 14, wherein the processor is further configured to determine a change of the call originating mobile terminal based on a threshold associated with the period.

19. The mobile terminal of claim 14, wherein the processor is further configured to determine a change of the call originating mobile terminal based on a reception state of media data.

20. The mobile terminal of claim 14, wherein the processor is further configured to determine a change of the call originating mobile terminal based on ranking information of call originator candidates;
wherein the ranking information of call originator candidates is pre-configured based on a topology of mobile terminals; and
wherein the processor is further configured to reset a timer based on the period.

* * * * *